United States Patent

[11] 3,614,380

| [72] | Inventor | Warren E. Bray<br>Lodi, Calif. |
|---|---|---|
| [21] | Appl. No. | 872,613 |
| [22] | Filed | Oct. 30, 1969 |
| [45] | Patented | Oct. 19, 1971 |
| [73] | Assignee | Richard E. Warner<br>Edgewood Drive, Lodi, Calif.<br>a part interest |

[54] WELDING ROD
5 Claims, 4 Drawing Figs.

[52] U.S. Cl. .................................................. 219/146
[51] Int. Cl. ..................................................... B23k 35/22
[50] Field of Search .......................................... 219/145,
146, 118; 117/202, 203, 204, 205, 206; 148/24, 26

[56] References Cited
UNITED STATES PATENTS

| 2,055,393 | 9/1936 | Thomas ........................ | 219/146 |

*Primary Examiner*—J. V. Truhe
*Assistant Examiner*—Lawrence A. Rouse
*Attorney*—Townsend and Townsend ABSTRACT: A welding rod comprised of a tubular body of welding material capable of fusing to provide a weld. The body has a bore therethrough longitudinally thereof, the bore being substantially filled with a mass of solder. The welding rod is especially adapted for welding an aluminum body to a body of another material.

PATENTED OCT 19 1971  3,614,380
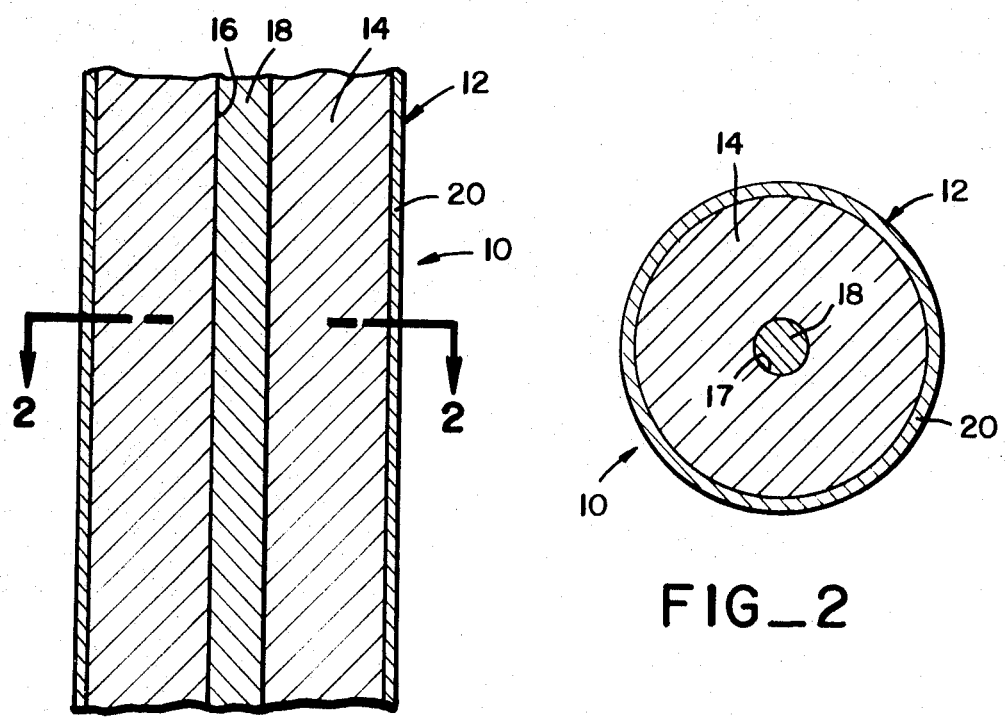
FIG_2
FIG_1
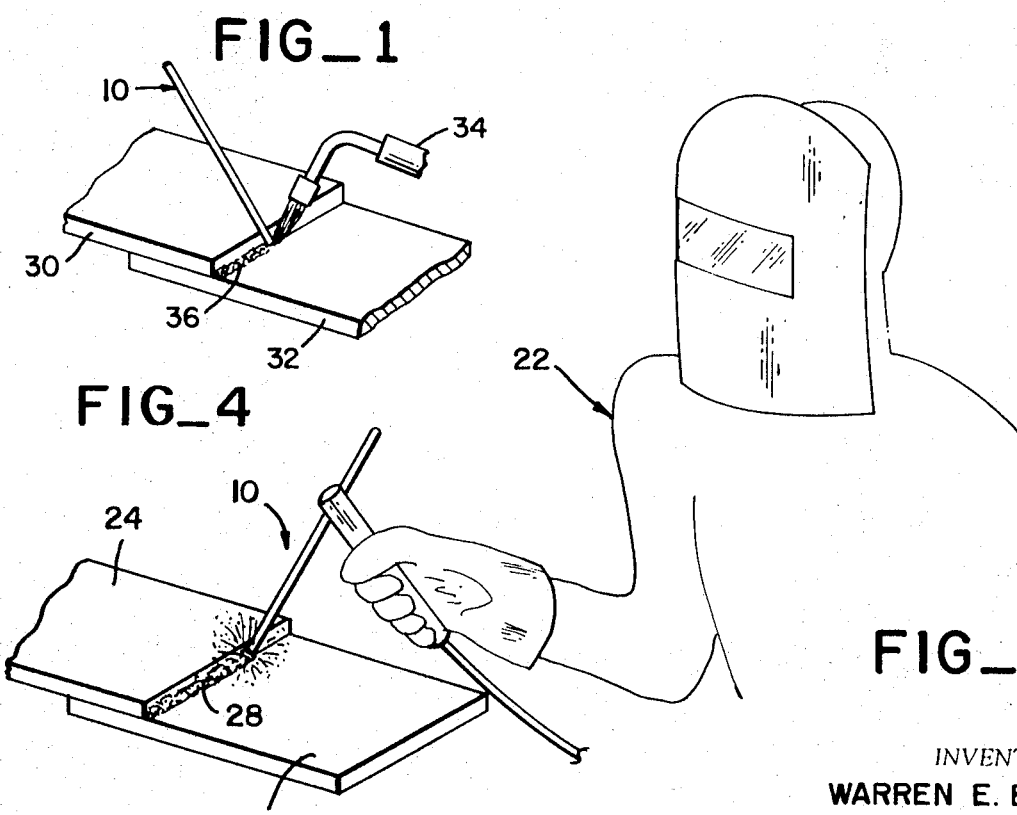
FIG_4
FIG_3
INVENTOR.
WARREN E. BRAY
BY
Townsend and Townsend
ATTORNEYS

WELDING ROD

This invention relates to improvements in welding rods and, more particularly, to a welding rod capable of welding aluminum to another metal.

It has generally been impossible in the past to readily weld aluminum to steel, stainless steel or to other metals, such as copper, brass or tin. This is probably due to the difference in chemical composition of the dissimilar metals as well as to differences in their melting points and the ability of the molecules of one metal to be physically and chemically bonded to the molecules of the other metal. As a result, attempts to weld aluminum and another metal together have been heretofore generally impractical from a cost standpoint. The present invention provides a solution to the problem of welding aluminum to another metal by providing a welding rod, preferably of aluminum, having a core of solder which melts with the rod material to form the welding metal or filler which bridges the junction between a body of aluminum and a body of another metal, such as any of the above-mentioned metals. While the precise reason for the good results is not fully explainable, it is believed that the solder conditions the aluminum and the other metal during the welding operation to cause the molecules of the different metals to be physically and chemically bound together to provide a weld having strength substantially equal to that of a weld joining two bodies of the same metal.

The invention includes a rod of weld material capable of fusing to present the weld material for a welding operation. The rod can be used in brazing or gas welding with a torch or flame, can be used in electric or arc welding, or can be used in resistance or spot welding if desired.

The rod can be of any cross section but, for purposes of illustration, it will be described as being cylindrical with a bore or passage extending through the same along its length and concentric with its outer cylindrical surface. A mass of solder substantially equal in volume to the rod substantially fills the bore to form with the rod body a welding rod unit which can be used to achieve the desired results of welding a body of aluminum to a body of another metal. Silver solder or regular solder can be used so that the welding rod of this invention can be made in volume and at a relatively low production cost. The rod of this invention can also be used and stored in the same manner as a conventional welding rod and does not require that a welder have any special skills to use it in any of the welding processes mentioned above.

The primary object of this invention is to provide an improved welding rod capable of effecting the welding of aluminum to another metal so as to provide a weld whose strength characteristics are substantially the same as those of a weld between two similar metals.

Another object of this invention is to provide a welding rod of the type described wherein the rod is tubular along its length to provide a bore therethrough for receiving a mass of solder which substantially fills the bore, whereby the solder melts with the rod itself during the welding operation so as to condition the two metals of the weld sufficiently to cause them to be physically and chemically bonded together to assure that the weld will have a strength characteristic of an acceptable value.

A further object of this invention is to provide a method of welding wherein a welding rod as described above is used to weld a body of aluminum to a body of another metal.

Yet another object of this invention is to provide a welding rod of the aforesaid character which can be used in brazing or gas welding, electric welding, or spot welding to permit the rod to be used in a number of different applications requiring aluminum to be welded to another metal.

Other objects of this invention will becomes apparent as the following specification progresses, reference being had to the accompanying drawing for an illustration of an embodiment of the invention.

In the drawings:

FIG. 1 is an enlarged, fragmentary, cross-sectional view of the welding rod of this invention;

FIG. 2 is a cross-sectional view taken along line 2—2 of FIG. 1;

FIG. 3 is a perspective view of the rod as used by a welder in the arc welding of two bodies of dissimilar metals together; and FIG. 4 is a fragmentary perspective view of the rod being used in a gas welding operation.

The welding rod of this invention is broadly denoted by the numeral 10 and includes an aluminum body 12 having a first tubular portion 14 of cylindrical configuration, portion 14 having a bore or passage 16 therethrough which is substantially filled with a mass 18 of solder. The bore is concentrically disposed with respect to the outer surface of portion 14 and the solder can be placed in the bore in any suitable manner at any time after the manufacture of portion 14 and before use of the welding rod. Body 12 also has a coating of flux material on the outer surface of portion 14 to facilitate the flow of the solder and the material comprising portion 14 during a welding operation in which rod 10 is used. The material of portion 14 is preferably of aluminum when rod 10 is used to weld aluminum to a body of steel, stainless steel, copper, brass, tin or other metals. The solder can be silver solder or regular solder, such as acid core solder. Also, the solder can contain alloys, such as an alloy of tin and lead. For purposes of illustration, the melting point of the solder is about 800° F. Other materials can be added to the solder to improve its wetting qualities or grain size or to produce alloys having different melting temperatures.

It is preferred that there be a 1:1 ratio of the volume of aluminum to the volume of solder in rod 10. Thus, bore 16 will be of a size relative to tubular portion 14 to achieve this ratio. Such a combination of aluminum and solder permits both of them to flow more freely during a welding process with the result being a proper weld of the two bodies to be welded together.

Rod 10 is shown in FIG. 3 as being used in an arc or electric welding process to weld a body 24 of aluminum to a body 26 of another metal such as any one of the metals mentioned above. The rod is used in the normal manner of arc welding wherein an arc is struck between the rod and bodies 24 and 26 when the rod serves as one electrode of an electrical circuit and one or both bodies 24 and 26 serves as the other electrode of the circuit. The rod is held by a welder 22 with a conventional rod holder and, once the arc is struck, the rod melts as do bodies 24 and 26 to form a weld 28 as shown in FIG. 3.

The method of the invention, therefore, includes the steps of positioning bodies 24 and 26 adjacent to each other, providing a welding rod having the construction shown in FIGS. 1 and 2, and in creating a source of heat adjacent to one end of the welding rod and the metals being welded. In FIG. 3, this source of heat is generated by striking the rod and solder to melt and also to cause melting of bodies 24 and 26 in the vicinity of the arc.

In FIG. 4, a gas welding operation is shown wherein a body 30 of aluminum is being welded to a body 32 of another metal, such as any one of the metals mentioned above, by using a welding torch 34 whose flame is generated by burning gases in the usual manner. Rod 10 is positioned adjacent to the flame and is melted thereby to form the weld material or filler to result in a weld 36 at the junction of bodies 30 and 32. The solder in the rod conditions these bodies sufficiently to cause them to physically and chemically bond together to present a weld whose strength characteristics are of an acceptable value.

Before rod 10 is used in a welding operation, it is generally required that the bodies which are to be welded together be properly cleaned with a suitable cleaning agent, such as muriatic acid. This assures that the desired physical and chemical bond between the bodies will result as rod 10 is used during the welding operation.

The mass of solder in the welding rod provides the means by which an aluminum body can readily be welded to another metal by any one of the above-mentioned welding processes.

The reason that this unexpected result is achieved is believed to be because the solder conditions the dissimilar metals to the extent that the molecules of one of the metals become physically and chemically bonded to the molecules of the other metal. This result has not been achieved with the use of conventional welding rods; thus, the presence of the solder provides the necessary catalyst by which aluminum and steel or stainless steel or another metal can be welded together. The weld resulting from the use of the welding rod of this invention has substantially the same strength characteristic as that of a weld between two bodies of the same metal. Also, the welding rod of the invention can be handled and stored in substantially the same manner as a conventional welding rod and does not require any special skills on the part of the welder.

I claim:

1. A welding rod comprising: a tubular body formed of aluminum and presenting an elongated bore therein and a mass of solder substantially filling said bore.

2. A welding rod as set forth in claim 1, wherein said body is substantially cylindrical, said bore being concentrically disposed in said body, said mass of solder substantially filling said bore.

3. A welding rod as set forth in claim 1, wherein is provided a coating of flux material on the outer surface of the body.

4. A welding rod as set forth in claim 1, there being a 1:1 ratio volume of said body and the volume of said mass.

5. A welding rod for welding aluminum to a different material comprising: a substantially cylindrical body of aluminum, said body being provided with a longitudinal bore therethrough substantially concentric with the outer surface of the body; a mass of solder disposed in the bore and substantially filling the same; and a layer of flux material on the outer surface of the body.